United States Patent [19]
Teague

[11] Patent Number: 5,383,605
[45] Date of Patent: Jan. 24, 1995

[54] RADIO CONTROLLED SPRAYING DEVICE

[75] Inventor: Jim C. Teague, Grand Rapids, Mich.

[73] Assignee: Hydro-Chem Systems, Inc., Grand Rapids, Mich.

[21] Appl. No.: 988,749

[22] Filed: Dec. 10, 1992

[51] Int. Cl.⁶ .......................... B05B 7/02; B05B 9/01; B05B 12/00
[52] U.S. Cl. ...................... 239/526; 239/525
[58] Field of Search ............... 239/525, 526; 134/123; 340/825.72; 222/63, 179; 251/129.04; 137/606

[56] References Cited

U.S. PATENT DOCUMENTS

| | | | |
|---|---|---|---|
| 3,322,350 | 5/1967 | Heinicke et al. | 134/123 X |
| 4,715,391 | 12/1987 | Scheller | 134/123 X |
| 4,848,383 | 7/1989 | Buhler | 134/123 |
| 4,850,536 | 7/1989 | Teranishi et al. | 239/526 X |
| 5,098,023 | 3/1992 | Burke | 134/123 X |
| 5,148,829 | 9/1992 | Deville | 251/129.04 X |
| 5,226,629 | 7/1993 | Millman et al. | 251/129.04 |

Primary Examiner—Andres Kashnikow
Assistant Examiner—Lesley D. Morris
Attorney, Agent, or Firm—Waters & Morse

[57] ABSTRACT

A power spraying device is disclosed for applying a liquid to a surface. The electronic control of the device is contained within the nozzle of the sprayer and emits radio wave signals to initiate operation of the device. The radio signals are detected by a receiver which converts the radio signals into control signals for a main pumping unit. The radio waves may also control the introduction of various chemicals into the liquid solution by the main pumping unit. The nozzle also contains a deadman's switch for turning off the flow of liquid in case the unit is accidentally dropped.

13 Claims, 4 Drawing Sheets

RADIO CONTROLLED SPRAYING DEVICE

BACKGROUND OF THE INVENTION

This invention relates to a power spraying device. More particularly, it relates to a device for applying a liquid to a surface in which a wireless electronic control is contained within the nozzle mechanism of the sprayer. The electronic control emits a signal which is transmitted to a receiver via radio waves. The receiver converts the signal to a control signal which is used to control the operation of a pumping unit, thereby providing pressurized liquid to the nozzle with a hose.

The power spraying device may be used in a variety of applications, including but not limited to: paint application; pressure washing; aircraft deicing; fire fighting; animal disinfecting; and the application of pesticide or preservative to vegetable matter.

One type of industry for which the power spraying device is especially well suited is the pressure washing industry. Pressure washing is well known and is used to wash a variety of objects including but not limited to: vehicles which are too large to fit into a conventional car wash, boats, mobile homes, houses, and large buildings. The pressure wash pumping apparatus may be permanently fixed into a structure such as a large warehouse or alternatively contained within a van and transported to the wash site.

In conventional pressure washing systems, the liquid solution, which is usually pressurized at a main pumping unit, must be turned on and off. The solution may also be heated. The controls for these functions are usually found at the main pumping unit. Additionally, during a pressure wash, the composition of the liquid is usually varied. Different chemicals and chemical mixtures are combined in varying sequences to provide an optimum wash. It is also not uncommon for pressure washing devices to provide for two different types of soap, a rinse cycle, and a wax cycle. These chemical mixtures must also be controlled. The controls are usually found at the main pumping unit.

Because the hose is long and the structures to be washed are large, manually controlling the system at the main pumping unit is cumbersome. Either one person has to walk back and forth to the spraying unit or two people must be employed to efficiently use the power spraying device, one to operate the nozzle and the other to operate the controls.

To avoid the above mentioned problems, electrical controls have been placed at the handle of the nozzle mechanism. Such controls have been electrically connected to the main pumping unit by a conductive cable, which is either adjacent to the hose or employs the conductive braided jacket on the hose. There are several disadvantages to using an electrical cable. First, the cable must be made very durable to resist breakage. This can increase the weight and expense of the cable. Second, the electrical cable may break under the constant flexing and manipulation of the hose. This necessitates replacement of the entire hose which is very costly. Third, the insulation surrounding the electric cable may break allowing the cable to contact either the liquid in the hose or the liquid draining off the sprayed fixture, causing electrical malfunction.

Radio transmission of control signals from a remote transmitter by a hose operator to a receiver electrically connected to a main pumping unit has also been tried. However, in such systems the transmitter has been separate from the pressure washer and frequently has had limited functional capabilities. In one application the transmitter rests at a separate location from the pumping facility which is closer to the operator. Alternatively, the transmitter may be a garage door opener type of device attached to a belt worn by the operator. Both methods have limited capabilities and can create considerable inconvenience to the operator while allowing possible damage to the transmitter. The operator must separately manipulate the radio transmitter while maintaining control over the spray nozzle. However, the high pressure spray nozzle can require two hands to effectively control. Thus, the operator is compromised by the removal of at least one of his hands from the nozzle to manipulate the separate radio transmitter. The nozzle, under the high liquid pressure from the hose may break free from the operator's grip possibly damaging the equipment and injuring the operator.

An object of the present invention is provide a power spraying device in which a sophisticated multifunction radio controller is contained within the nozzle mechanism of the device. Another object of the invention is to reduce the weight and increase the reliability of the liquid solution delivery system which allows greater control by the operator while reducing fatigue. Another object of the invention is to provide an improved radio control apparatus for operating a power washer or the like. Still another object of the invention is to simplify operation of the device and increase the efficiency of operation.

SUMMARY OF THE INVENTION

A remotely controlled pumping system for unidirectionally delivering a fluid from a pumping unit through a hose to a remote outlet nozzle mechanism includes a radio transmitter which is contained within the nozzle handle of the device and a receiver at the pumping unit for controlling pump operations. The radio transmitter transmits radio control signals in response to switches on the nozzle handle which are controlled by the operator. The radio signals are received by the radio receiver, which thereby controls the pumping module. The pumping module then pumps the fluid through the hose to the nozzle in response to the control signals received by the radio receiver. The signals transmitted from the radio transmitter in the nozzle handle can control pump operation and the amount of chemicals that are added to a liquid solution delivered by the pumping module. Multifunction operation is achieved by digital devices that modulate or code the radio signal in the transmitter with information from the manually operated switches and which convert the radio signal received by the receiver to operating instructions for the pumping module element. The transmitter is integrally incorporated into the handle for the nozzle and is operated by conveniently accessible switches on the handle.

DETAILED DESCRIPTION OF THE PREFERRED EMBODIMENTS

Figure 1:
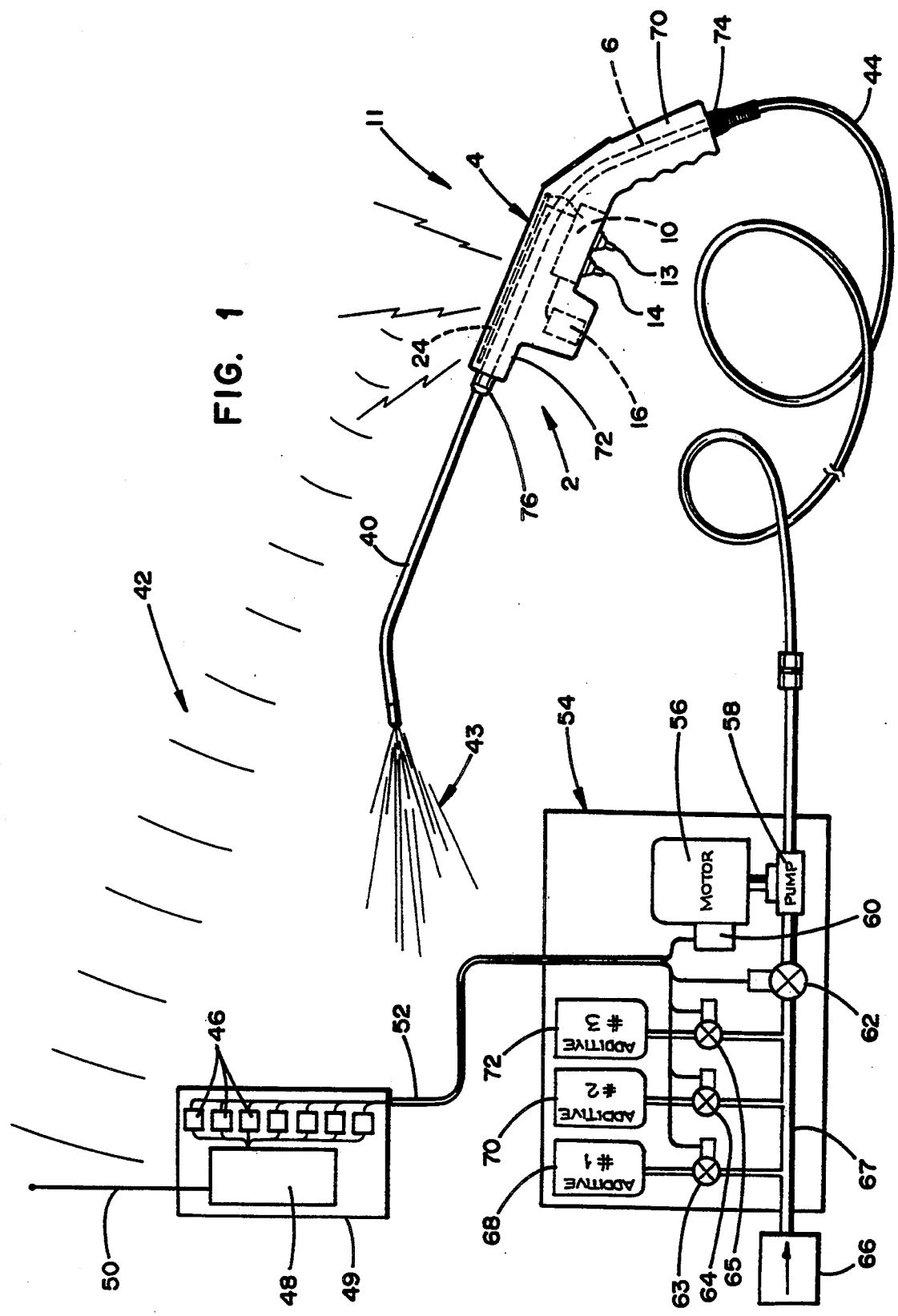
FIG. 1 is a schematic diagram of the power spraying system showing the transmitter nozzle, radio receiver, and pumping module.

Referring to the drawings and more particularly to FIG. 1, a radio controlled spraying system 11 is provided for unidirectionally delivering a liquid solution 43 to a surface to be contacted. The system comprises a hand held nozzle mechanism 2, which is connected to a pumping module 54 by a pressure hose 44. The system will be described for exemplary purposes in connection with a pressure washing system, but the system can be employed in other fluid pumping systems where a pumping unit is controlled from a remotely located hand held nozzle. The solution is pumped through fluid hose 44 to nozzle mechanism 2, which comprises a spray wand or accessory 40 attached to nozzle handle or housing 4. A radio transmitter 10 is contained within the housing 4 of nozzle mechanism 2 and generates a carrier signal. Digital circuitry in the transmitter modulates the carrier signal with control signal information reflecting the state of actuating switches mounted on the handle. The transmitter transmits the modulated signal as radio wave 42.

The carrier signal of radio wave 42 is tuned to a predetermined frequency and is received by antenna 50 which is connected to radio receiver 48 in housing 49. The radio receiver includes digital logic circuitry that decodes the radio wave into control signal instructions which are then used to turn relays 46 on and off. The signals from relays 46 are then communicated to pumping module 54.

Pumping module 54 contains motor 56, which provides power to pump 58. Motor 56 may be electric, gas or diesel. The motor operation is controlled by motor relay 60. If the motor is a gas or diesel motor, the motor relay may be a starter relay, grounding relay, or a clutch relay. The flow of liquid is controlled by primary liquid solenoid 62. When solenoid 62 allows the fluid to pass, it is pumped from primary fluid source 66 via fluid passageway 67. While not limited thereto, the primary fluid source 66 may be a liquid storage tank, a municipal water system, a well, a lake or a stream.

Various chemicals such as soaps, detergents, anti-icing agents, anti-combustion chemicals, waxes, and paints may be introduced through chemical solenoids 63, 64, and 65. The spirit and scope of the present invention does not require three chemical solenoids. One, two, or more than three solenoids may be used depending upon the application. However, for power washing, the option of three chemical additives provides the most efficient means of varying the chemical content of the liquid. The three chemical solenoids 63, 64, and 65 respectively control the introduction of three chemicals from three chemical sources 68, 70, and 72 into fluid passageway 67. For power washing, the chemical sources may, for example, be small tanks of concentrated chemicals including different types of soap and possibly wax. Multi-wire cable 52 delivers the control signals which turn on and off motor relay 60, primary solenoid 62 and chemical solenoids 63, 64 and 65.

Relays 46 allow electromagnetic radiation signals received by radio receiver 48 through antenna 50 to be converted to the control signals transferred to the pumping module through multi-wire cable 52. The electromagnetic radiation signals received by antenna 50 are transmitted by radio transmitter 10 contained in nozzle housing 4. While radio receiver 48 is shown in the drawings as a separate unit connected to pumping module 54 by multi-wire cable 52, this need not be the case. Alternatively, both receiver 48 and pumping module 54 may be contained within the same unit.

Figure 2:
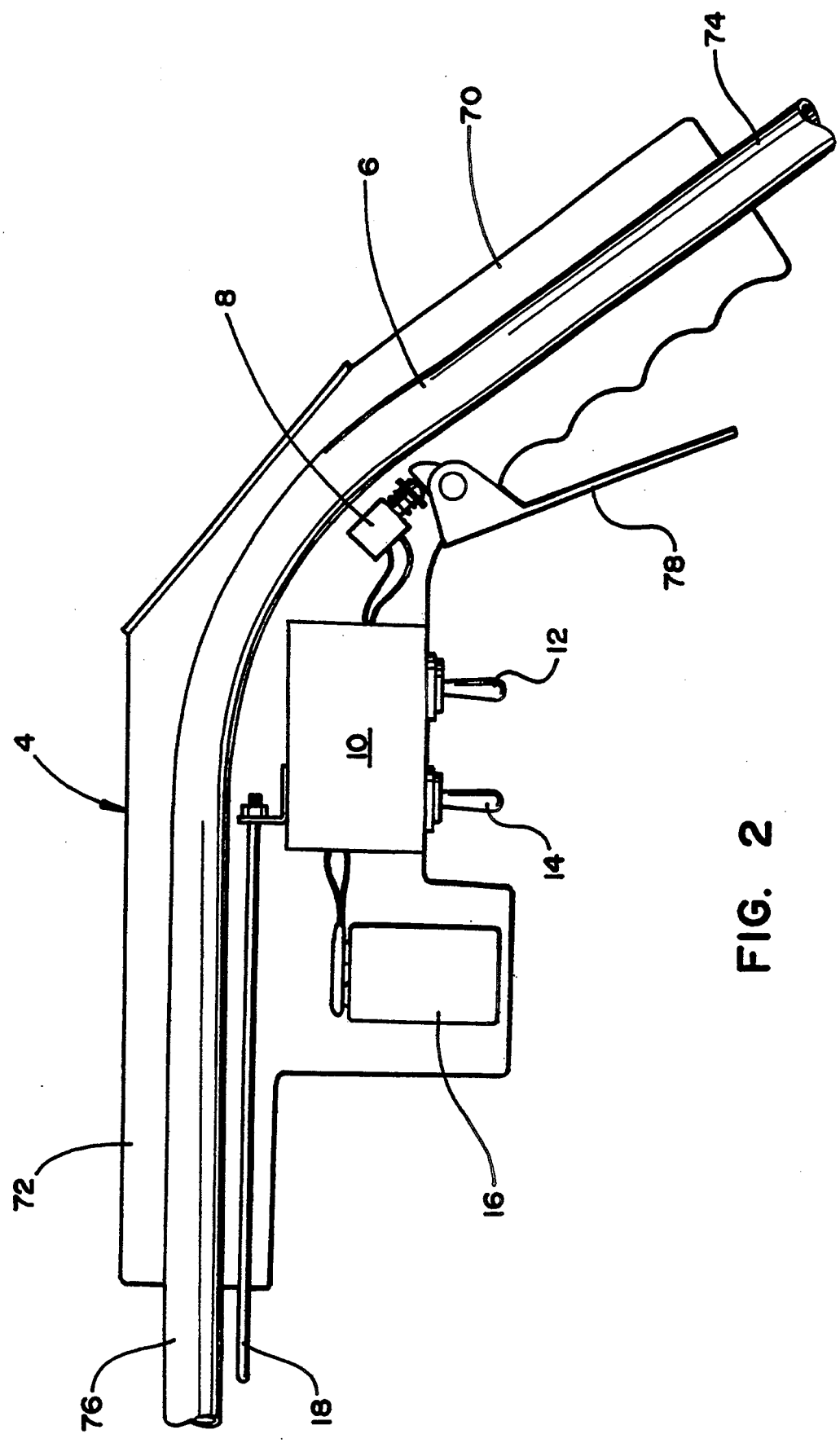
FIG. 2 shows a sectional view of a nozzle handle containing the radio transmitter with toggle switches, a power supply, a spring loaded deadman's switch, and an antenna incorporated in the nozzle housing.

In reference to FIG. 2, a sectional view of nozzle housing 4 is provided. Nozzle housing 4 is a pistol-grip handle mechanism having a hand grip portion 70 attached at an angle to a barrel portion 72. A liquid tube 6 extends internally from an inlet 74 at the base of the handle grip to an outlet 76 in the outer end of the barrel. The outlet is attached to spray wand 40 or other nozzle accessory. The inlet of tubing 6 connects to fluid hose 44. The tubing may be made out of many materials, including PVC, but preferably is stainless steel. Alternatively, the tubing may be integrally formed in the nozzle housing 4 itself. The nozzle housing 4 may be made out of metal but preferably is formed out of a resilient, high density, high impact plastic. Antenna 18, radio transmitter 10 and power supply 16 are mounted in internal recesses in the housing. The housing either is formed in two separable sections or it includes access openings to provide access to the recesses for service or replacement of the battery and electronic components. Power supply 16 may be a replaceable battery such as a 9 volt battery or alternatively a rechargeable battery. Note also that in this embodiment, antenna 18 is partially exposed external to nozzle housing 4. This provides improved transmission of electromagnetic radiation signal 42. When the antenna is recessed in the housing, the housing should be formed of a radio signal transmissive plastic or the like.

Nozzle housing or handle 4 is constructed to fit easily in the hands of the operator. The operator may steady his hold on the nozzle mechanism by grasping the housing barrel externally near the battery storage area as well as grasping the hand grip at the deadman's switch 8.

Externally mounted in a trigger position on housing 4 is on/off switch 12 and chemical selector switch 14. On/off switch 12 turns primary liquid solenoid 62 on or off. However, switch 12 may also be used to turn off any component, including radio transmitter 10 or radio receiver 48 or motor relay 60. Chemical selector switch 14 is a three position switch that turns chemical solenoids 63, 64 and 65 on or off.

Spring loaded deadman's switch 8 is actuated by a lever 78 pivotally mounted on hand grip 70. The operator simply pulls lever 78 toward hand grip 70 to engage the switch while gripping the hand grip. This in turn opens primary solenoid valve 62. If the operator should accidentally drop nozzle mechanism 2, switch 8 is automatically released as a result of its spring loaded characteristic and primary solenoid valve 62 is closed. This feature is especially important in power washing because the enormous pressure of the liquid will whip the nozzle around if left unattended. This may cause serious damage to persons or property.

In an alternative embodiment, deadman's switch 8 may electronically control the force of the liquid spray. The amount of depression of switch 8 may be detected by circuitry contained in radio transmitter 10 and relayed as velocity information to radio receiver 48. In turn, primary solenoid 62 would be a variable valve instead of merely an on/off device. The partial opening and partial closing of this valve will respectively increase and decrease the amount of flow exiting the nozzle.

Figure 3:
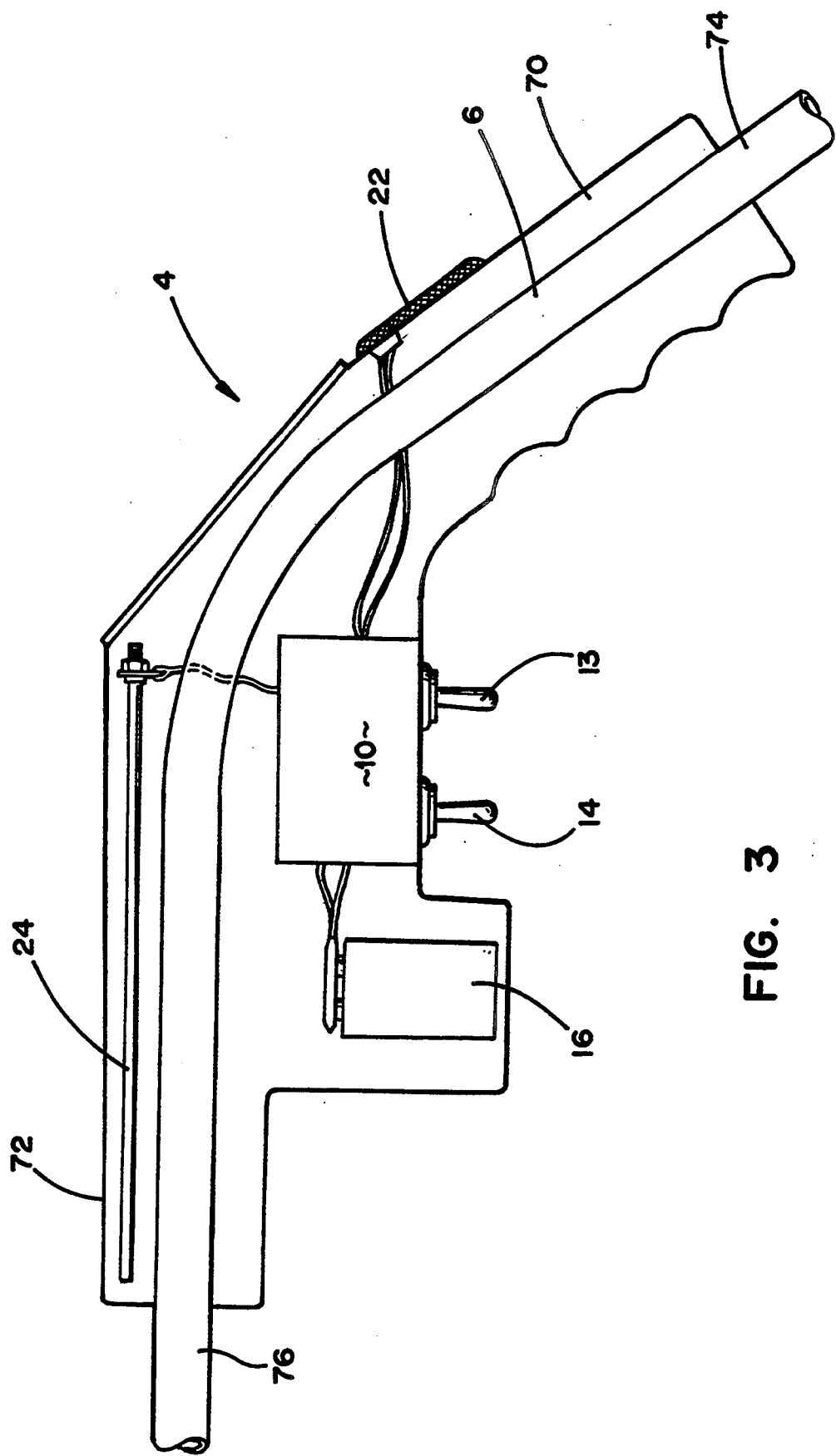
FIG. 3 shows an alternate embodiment of the nozzle handle of FIG. 1 showing a second position of the deadman's switch and the antenna fully contained within the top of the nozzle housing.

FIG. 3 provides an alternative embodiment of nozzle housing 4 (as shown in FIG. 1). In this embodiment antenna 18, which was partially exposed in FIG. 2, is replaced by antenna 24 that is entirely contained within handle casing 4. The handle is formed of a radio transmissive plastic. This provides increased safety and reduces the possibility of damage to the antenna. However, housing 4 may reduce the efficiency of transmission which may require more power. FIG. 3 also shows the replacement of finger held deadman's switch 8 and lever 78 with a palm held deadman's switch 22. For sustained operation, deadman's switch 22 provides less fatigue on the operator's hand. However, deadman's switch 8 as show in FIG. 2 allows the possibility of greater operator control over spray force. Switch 14 in FIG. 3 is identical to switch 14 as shown in FIG. 2.

Additionally, switch 12, indicated as a two position on/off switch in FIG. 2, has been replaced by three position switch 13 in FIG. 3. Three position switch 13 may be used to turn the pump on and off (by activating the motor relay) and also to signal primary solenoid 62 to commence operation. In this configuration, deadman's switch 22 is still used to control primary solenoid 62. However, with motor relay 60 still engaged, excessive wear on pump 58 may occur. Accordingly, deadman's switch 22 provides an emergency shut off, while three position switch 13 controls the engagement of motor relay 60.

Figure 4:
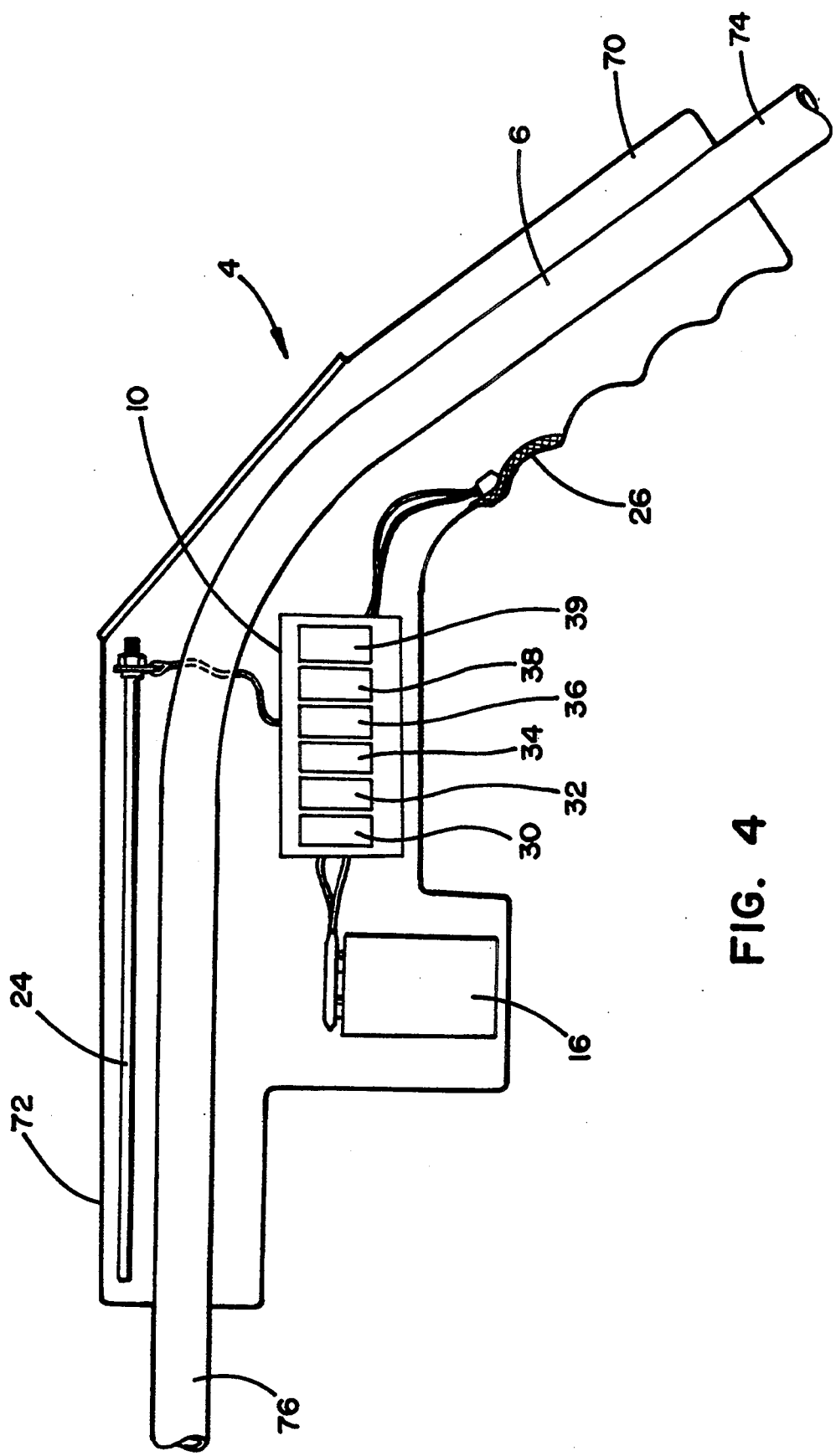
FIG. 4 shows another embodiment of the invention that employs membrane switches for the radio transmitter switches and the deadman's switch, with an increased number of membrane switches providing additional control features.

FIG. 4 provides still another embodiment of nozzle housing 4. In this configuration, switches 12 and 14 from FIG. 2 and switches 13 and 14 from FIGS. 1 and 3 are replaced by membrane switches 30, 32, 34, 36, 38, and 39, which respectively control various functions including: liquid on/off (primary solenoid 62); pump start/stop (motor relay 60); chemical selection (solenoids 63, 64, and 65); and rinse (disengages all chemical solenoids). Additionally, in the FIG. 4 embodiment the deadman's switches of FIG. 2 and FIG. 3 are replaced by a finger operated membrane switch 26.

It should be understood that the foregoing is merely exemplary of the preferred practice of the present invention and that various changes may be made in the arrangements and details of construction of the embodiments disclosed herein without departing from the spirit and scope of the present invention, which is defined in the appended claims.

I claim:

1. A radio operated control mechanism for operating a pressure sprayer, wherein the pressure sprayer comprises a motor driven pressure pump mechanism that receives liquid from a liquid source and receives selected additives from additive sources and pumps the liquid and selected additives under pressure through a hose to a hand held nozzle, the control mechanism including:
   a nozzle housing for the nozzle formed in the shape of a pistol grip handle with a barrel portion and a hand grip portion angularly disposed with respect to the barrel portion;
   a liquid conduit mounted in the nozzle housing and having an inlet and an outlet, the outlet facing outwardly from an outer end of the barrel portion;
   a plurality of manually actuatable electronic switches mounted in the nozzle housing in position for manual actuation by a user while the user holds the nozzle housing by the hand grip, the switches including:
      a deadman's switch that is actuated only when a user is holding the nozzle housing by the hand grip, the deadman's switch automatically becoming deactuated when the hand grip is released;
      a liquid on/off switch; and
      one or more additive switches for selecting chemical additives to the liquid;
   a radio transmitter and power supply therefor mounted in the nozzle housing in electrical contact with the switches, the radio transmitter generating output signals comprising a carrier wave digitally encoded with control information representative of the state or change of state of each of the switches;
   an antenna mounted to the nozzle housing and being connected with the transmitter to transmit the output signals from the antenna as airborne electromagnetic signals;
   a radio receiver in electrical communication with the pressure pump mechanism, the radio receiver receiving the airborne electromagnetic signals transmitted from the antenna and converting the signals into electrical control signals that control the operation of the pump mechanism;
   electrical controls connected to the pump mechanism in communication with the radio receiver, the electrical controls including:
      an electrically operated main flow control valve that opens and closes a passageway from the liquid source to the pump mechanism, the passageway being closed and the liquid being shut off and not being delivered to the pump mechanism when the main flow control valve is deactuated;
      a switch that controls the actuation of the pump motor; and
      an additive flow control valve for each additive that controls the flow of each additive into the passageway along with the liquid passing from the source to the pump mechanism;
   the electrical controls receiving the control signals from the receiver and operating the pump mechanism in response thereto, the control mechanism being such that it causes a control signal to be generated that deactuates the main flow control valve when the deadman's switch is deactuated, the control mechanism causing the main flow control valve to be actuated only when both the deadman's switch and the liquid on/off switch are actuated, and the control mechanism causing the additive flow control valve to open for each additive when the selection switch for that additive is actuated at the nozzle.

2. A control mechanism according to claim 1 wherein the deadman's switch is a pressure sensitive membrane switch mounted on the hand grip portion of the nozzle housing in position such that the membrane switch is pressure actuated when and only when the operator is holding the nozzle housing by the hand grip, the membrane switch having leads that extend into the interior of the nozzle housing into electrical connection with the transmitter.

3. A control mechanism according to claim 2 wherein the deadman's switch is mounted so as to be actuated by the palm of the operator's hand when the operator is gripping the hand grip.

4. A control mechanism according to claim 2 wherein the deadman's switch is mounted so as to be actuated by at least one finger of the operator when the operator grips the hand grip.

5. A control mechanism according to claim 2 wherein the electronic switches include at least two additive switches and the liquid on/off and additive switches are membrane switches mounted on the nozzle housing so as to be conveniently accessible for manual actuation by an operator holding the nozzle housing by the hand grip.

6. A control mechanism according to claim 1 wherein the deadman's switch is a lever operated switch that is engaged by the fingers of a hand holding the nozzle housing by the hand grip, the lever being drawn toward the hand grip and actuating the switch when the fingers are tightened on the lever, the lever being biased away from the hand grip so as to deactuate the switch when the lever is released.

7. A control mechanism according to claim 6 wherein the lever operated switch is a gradually variable switch and the main flow control valve is a variable valve, such that the main control valve is gradually opened as the lever is gradually moved inwardly to the hand grip, the control mechanism thus providing a variable rate of flow of liquid through the nozzle mechanism.

8. A control mechanism according to claim 1 wherein there are at least two additive switches in addition to the on/off switch and the deadman's switch, the transmitter and receiver conveying control information for these switches by a single frequency carrier wave that is digitally encoded with discreet digital control information for all of the switches.

9. A control mechanism according to claim 1 wherein the antenna is an elongated electrically conductive member that extends along the barrel portion of the nozzle housing.

10. A control mechanism according to claim 9 wherein at least the major portion of the antenna is positioned inside the nozzle housing, with electrical contact for the antenna being isolated from liquid contact.

11. A control mechanism according to claim 10 wherein the entire antenna is located in a water tight chamber inside the nozzle housing and the portion of the nozzle housing surrounding the antenna is formed of a radio transmissive material.

12. A radio operated control mechanism for operating a pressure sprayer, wherein the pressure sprayer comprises a motor driven pressure pump mechanism that receives liquid from a liquid source and receives selected additives from additive sources and pumps the liquid and selected additives under pressure through a hose to a hand held nozzle, the control mechanism including:

a nozzle housing for the nozzle formed in the shape of a pistol grip handle with a barrel portion and a hand grip portion angularly disposed with respect to the barrel portion, the nozzle housing being formed at least in part from a radio transmissive plastic resin with the nozzle housing having an interior chamber for electronic components that is sealed against water penetration;

a liquid conduit mounted in the nozzle housing and having an inlet and an outlet, the outlet facing outwardly from an outer end of the barrel portion;

a plurality of manually actuatable electronic switches mounted in the nozzle housing in position for manual actuation by a user while the user holds the nozzle housing by the hand grip, the switches including:

a liquid on/off switch; and one or more additive switches for selecting chemical additives to the liquid;

a radio transmitter and power supply therefor mounted in the nozzle housing in electrical contact with the switches, the radio transmitter generating output signals representative of the state or change of state of each of the switches;

an antenna mounted in a water tight chamber inside the radio transmissive portion of the nozzle housing and being connected with the transmitter to transmit the output signals from the antenna as airborne electromagnetic signals;

a radio receiver in electrical communication with the pressure pump mechanism, the radio receiver receiving the airborne electromagnetic signals transmitted from the antenna and converting the signals into electrical control signals that control the operation of the pump mechanism:

electrical controls connected to the pump mechanism in communication with the radio receiver, the electrical controls including:

a liquid control switch that controls the flow of liquid from the pump mechanism to the nozzle, liquid being pumped to the nozzle mechanism only when the liquid control switch is actuated; and an additive flow control valve for each additive that controls the flow of each additive to the nozzle mechanism along with the liquid pumped by the pump mechanism;

the electrical controls receiving the control signals from the receiver and operating the pump mechanism in response thereto, the control mechanism being such that it causes liquid to be pumped to the nozzle mechanism only when the liquid on/off switch is actuated, the control mechanism causing the additive flow control valve to open for each additive when the selection switch for that additive is actuated at the nozzle.

13. A control mechanism according to claim 12 wherein the antenna is an elongated electronically conductive member that is mounted in the barrel portion of the nozzle housing and extends along the barrel portion, the portion of the barrel portion of the nozzle housing surrounding the antenna being radio transmissive.

* * * * *